United States Patent Office.

FRITZ ROBERT LOUIS GEHRE, OF BREGENZ, AUSTRIA-HUNGARY.

ARTIFICIAL STONE.

SPECIFICATION forming part of Letters Patent No. 678,726, dated July 16, 1901.

Application filed April 5, 1900. Serial No. 11,760. (No specimens.)

*To all whom it may concern:*

Be it known that I, FRITZ ROBERT LOUIS GEHRE, a subject of the Emperor of Germany, residing at Bregenz, Vorarlberg, Austria-Hungary, have invented certain new and useful Improvements in Artificial Stone; and I do declare the following to be a full, clear, and exact description of the invention, such as will enable others skilled in the art to which it appertains to make and use the same.

The invention relates to the manufacture of artificial stone.

The magnesia cements made from magnesite and chlorates, as magnesium chlorid and aluminium chlorid, have the bad property of being neither waterproof nor durable against water, nor do they resist the influences of the weather and frost. I therefore use in place of the magnesites materials which, being united with chlorates, do not have this poor quality. These are boracite or stassfurthite or magnesium borate, each substance by itself or two or all of them combined with hydraulic or caustic magnesia, or also the latter alone. To one or more of these different substances selected as desired I add fifteen per cent. to twenty-five per cent., by weight, of pulverized crystalline or solid calc-spar in order to greatly increase the hardness and also at the same time to give a great impermeability to water and durability to the weather.

Heretofore calc-spar has been used in various artificial stones, however, as happens in the Preussner patent, for example, entirely as filling material in combination with magnesite; but it is impossible to gain a technical result if calc-spar is used entirely as a filling material only for magnesite, for the carbonic acid contained in it causes a swelling or cracking of the overlaid surface or previously-prepared objects, while according to my practical experience and tests the calc-spar in the combination obtained by me with the above-named materials does not have this bad property.

The dry mixtures obtained in the above-described manner I bring into watery solution of chlorids or chlorates—for example, zinc chlorid, aluminium chlorate, ammonium chlorid, magnesium chlorid, or others similar, whereof I use each singly or several combined. The proportions are governed by the quality of the raw material and the purpose of application and range from thirty per cent. to forty per cent., by weight. As filling material for the mass I use ten per cent., by weight, paper-pulp after it has been prepared in the following manner: I mix the still wet paper-pulp in the finest condition with a very small part of the mixture of boracite or stassfurthite or magnesium borate and with one or more of the above-named chlorates and with calc-spar and allow the product so obtained to harden. After being thoroughly hardened this product is converted into a pulverized state in order to be used as filling material in the specified manner. This process in the preparation of the paper-pulp is necessary, because the paper-pulp supplied wet balls together in small lumps, which would form uneven soft places in the prepared product. In order to give the ready product a marbled or any other desired appearance, the filling material (the paper-pulp) may be colored.

Having thus fully described my invention, what I claim as new and useful, and desire to secure by Letters Patent of the United States, is—

1. An artificial-stone composition comprising a chlorin salt, boracite, calc-spar, and a suitable filling material, substantially as described.

2. An artificial-stone composition, comprising a chlorin salt, boracite, calc-spar, and a filling of paper-pulp combined with a small quantity of a chlorin salt, substantially as described.

In testimony whereof I have hereunto set my hand in presence of two subscribing witnesses.

FRITZ ROBERT LOUIS GEHRE.

Witnesses:
 JEAN GRUND,
 IGUAZ HOLZWARTH.